UNITED STATES PATENT OFFICE 2,594,211

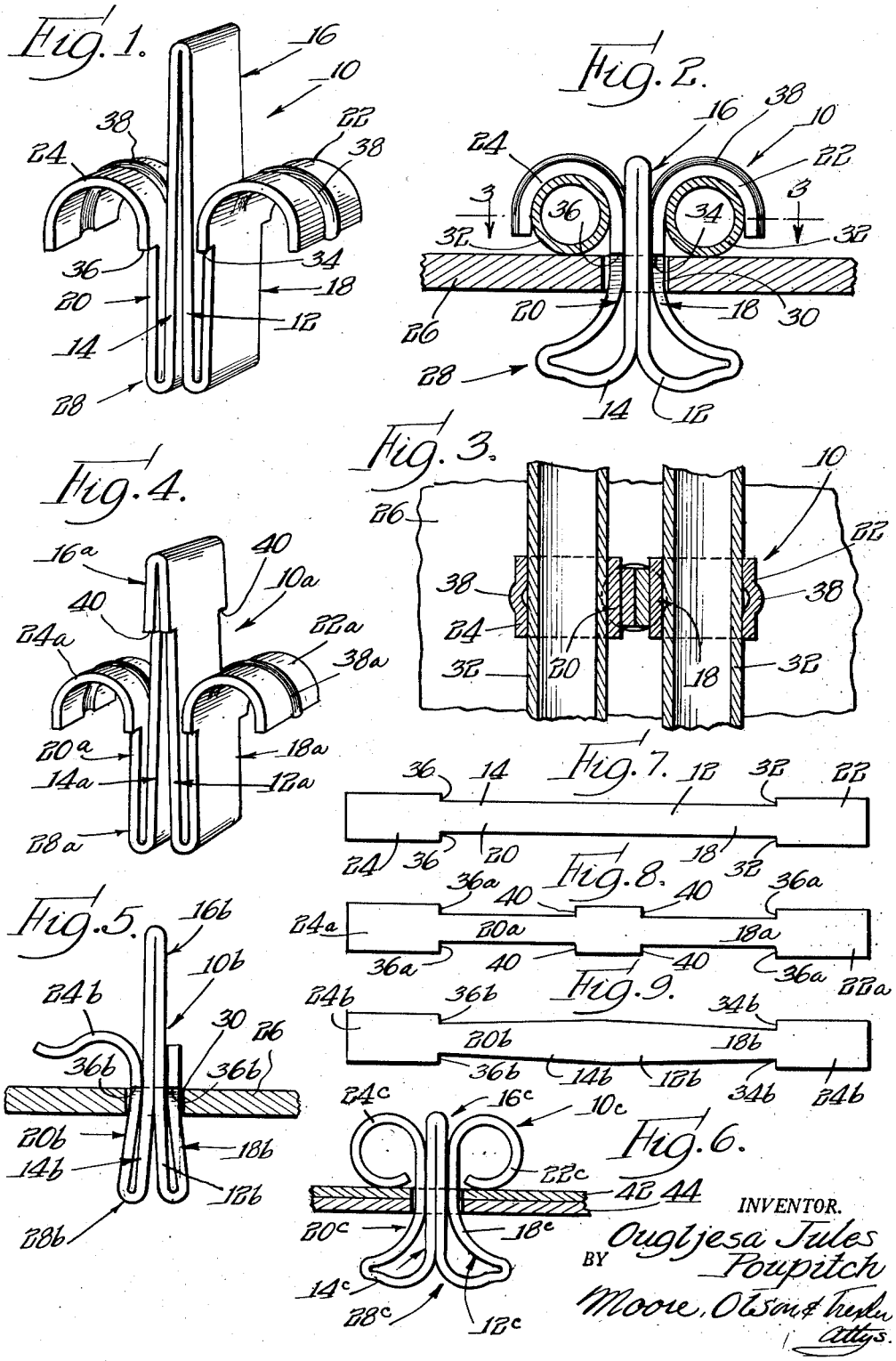

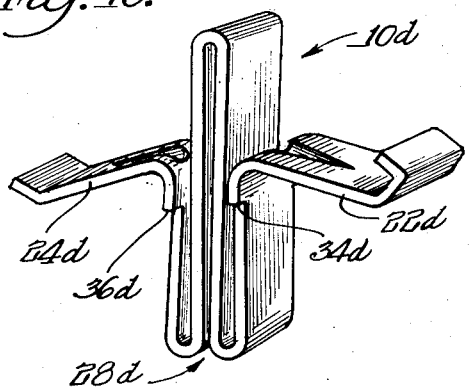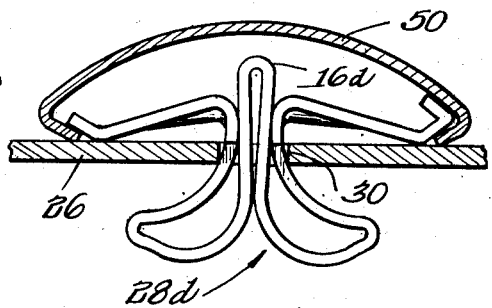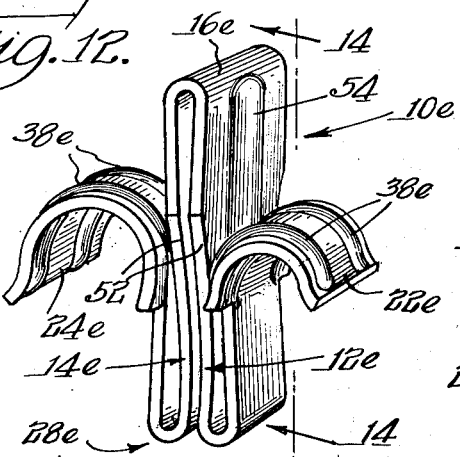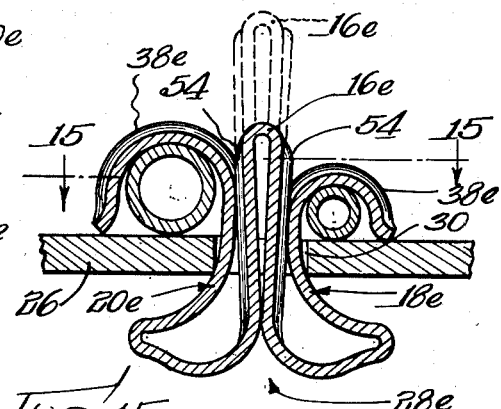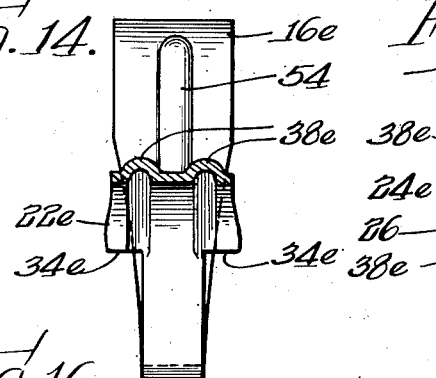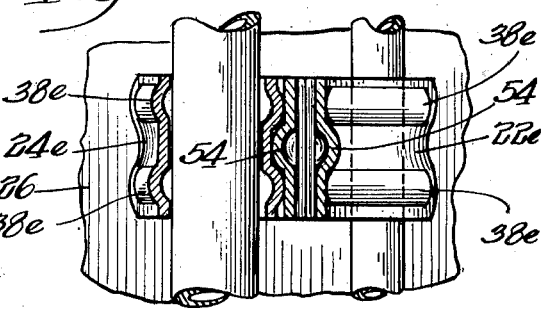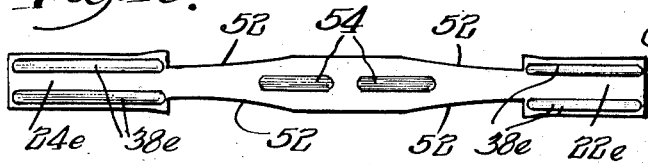

FASTENER HAVING CLAMPING HEAD

Ougljesa Jules Poupitch, Chicago, Ill., assignor to Illinois Tool Works, Chicago, Ill., a corporation of Illinois Application July 27, 1948, Serial No. 40,878

5 Claims. (Cl. 248—68)

This invention relates generally to fastening devices and more particularly to fasteners of the type adapted for insertion within a work aperture followed by hammer blows applied to a protruding portion of the fastener, the latter serving to spread the inner extremity of the fastener.

It is an object of the present invention to provide a fastener of the type referred to above which will serve to hold or secure work parts, as for example tubing or other devices to which the unit may be adapted, in position upon a work sheet or panel.

One of the potential hazards incident to the use of hammer driven fasteners is that of applying excessive or crushing pressures to the part to be secured, and the present invention contemplates a fastener which, although adapted to be hammer driven, will resiliently, yet firmly clamp a work part in place without the slightest danger of applying excessive pressures. To this end, a fastener is contemplated having accurately located abutment means for limiting the extent of movement of the work clamping portion of the fastener. A fastener is thus provided particularly adapted for holding frangible work pieces, but also equally usable for holding various types and kinds of work pieces to which it may be shaped and adapted.

More specifically, it is an object of the present invention to provide an improved and relatively inexpensive fastener of the nature previously referred to, which may be formed from a single length of resilient stock and which is of blind fastener form capable of being inserted and secured in position from one side of the work aperture.

Another object of the present invention is to provide a blind fastener which not only serves to clamp the part against a work surface as mentioned above but also assures spreading of the fastener shank at the opposite end so as to enable the fastener to be used with equal facility for various thicknesses of work pieces.

The present invention also contemplates a hammer driven rivet type fastener formed from a single elongated strip of sheet stock bent intermediate its extremities to provide a protuberance for receiving hammer blows, and formed at at least one of its extremities with means for clamping a part against a work surface as an incident to the inward shifting of the protuberance.

The foregoing and other objects and advantages will be more apparent from the following detailed description when considered in connection with the accompanying drawing wherein Fig. 1 is a perspective view of a fastener which is representative of one embodiment of the present invention;

Fig. 2 discloses the fastener of Fig. 1 applied to a work piece for the purpose of clampingly securing two tubular work parts in place;

Fig. 3 is a view taken substantially along the line 3—3 of Fig. 2;

Fig. 4 is a perspective view similar to Fig. 1 illustrating a slightly modified form of fastener provided with abutments or shoulders for limiting the extent to which the fastener protuberance may be hammer driven into position;

Fig. 5 is a view similar to Fig. 2 illustrating a slightly modified fastener in which only one extremity thereof is provided with means for accommodating or clampingly engaging a work part;

Fig. 6 is a view similar to Figs. 2 and 5 illustrating a further modified form of the fastener which is provided with resilient head portions adapted to cooperate with the oppositely disposed spread shank portions to secure two work sheets together, and if desired to also hold a work part in place;

Fig. 7 illustrates the sheet metal blank from which the fastener of Figs. 1 to 3 inclusive may be formed;

Fig. 8 is a plan view of the blank used for producing the fastener of Fig. 4;

Fig. 9 is a plan view of the blank similar to Fig. 7, differing from Fig. 7 in that the shank portion of the fastener is provided with a taper so as to enable the fastener to wedge itself within a work aperture and thus limit the extent to which the shank may be driven into said aperture;

Fig. 10 is a perspective view of a modified form of fastener, adapted for holding a molding strip or the like;

Fig. 11 is an elevational view of the structure of Fig. 10, in holding position, and applied to a work piece;

Fig. 12 is a perspective view of a further modified embodiment, the fastener embodying reinforcing and other features presently to be described;

Fig. 13 is an elevational view of the fastener of Fig. 12, in holding position;

Fig. 14 is a vertical sectional view of the fastener of Fig. 12 on the line 14—14 thereof;

Fig. 15 is a horizontal sectional view of the structure of Fig. 13, along the line 15—15 thereof; and Fig. 16 is a detail view, on a reduced scale, of the blank, partly formed, used in fabricating the fastener of Figs. 12–15.

Referring now to the drawings more in detail wherein like numerals have been employed to designate similar parts throughout the various figures, it will be seen that one embodiment of the present invention is illustrated in Figs. 1 to 3 inclusive, the fastener in said figures being designated generally by the numeral 10. This fastener 10 is preferably formed from a single elongated strip of sheet metal stock having the form illustrated by the blank of Fig. 7. In producing the fastener 10 from this blank it is bent intermediate its ends to provide adjacent shank portions 12 and 14. Before application to a work piece these shank portions 12—14 appear as illustrated in Fig. 1 with a portion thereof projecting upwardly in the form of a protuberance 16. The blank is then bent back upon itself to provide shank portions 18 and 20. The upper extremities of these shank portions 18 and 20 support arcuate clamping members or heads 22 and 24 respectively.

The fastener is applied to a work sheet as for example the work piece 26 of Fig. 2 by inserting the shank portions 12—14—18—20 (all of which parts are designated generally by the numeral 28) within a work aperture 30. The aperture 30 may be just large enough to loosely accommodate the shank 28 or it may be slightly smaller than the maximum cross-section of the shank 28, thus requiring the shank to be slightly compressed to permit of insertion. The latter arrangement enables initial snug fitting of the fastener shank within the aperture prior to the application of hammer blows against the protuberance 16.

In Fig. 2 the arcuate work clamping members or heads 22—24 embrace the complementary curved periphery of work parts or tubes 32. As the fastener 10 is initially inserted within the work aperture 30 the resilient work clamping members 22—24 are moved into engagement with the complementary surfaces of tubes 32. Hammer blows are then applied to the outer extremity of the protuberance 16 which causes abutments or shoulders 34—36 associated with the clamping members 22—24 respectively to be moved into engagement with the outer surfaces of the work piece 26 and the inner shank portion 28 spreads laterally as illustrated in Fig. 2. The shoulders or abutments 34—36 limit the extent to which the resilient clamping members 22—24 may be shifted in response to hammer blows upon the protuberance 16. When these shoulders are in engagement with the work surface the work parts or tubes 32 will be resiliently yet firmly held in place and the pressure exerted by the arcuate clamping members 22—24 is not in excess of the strength of the material from which the tubes 32 are formed. That is to say, the fastener is of such a nature that work parts may be firmly and resiliently held in place without any impairment which might otherwise result from the application of excessive clamping pressures. The spreading of the shank 28 draws the abutments 34—36 tightly against the work surface thereby providing a very secure fastener.

It will also be understood from the foregoing description that the fastener illustrated in Figs. 1 to 3 inclusive may be used with work pieces of various thicknesses. In other words, the fastener is not limited for use with work pieces of any given thickness. With view of adding strength and rigidity to the arcuate work clamping members they are provided with a central rib 38. While these ribs 38 lend a certain amount of rigidity it should be understood that the clamping members 22—24 are sufficiently resilient to afford desired yieldable contact or clamping engagement with the work parts 32.

In Fig. 4 a slightly modified fastener designated generally by the numeral 10-a is illustrated. The only structural difference between the fastener 10-a and the fastener 10 resides in the provision of shoulders or abutments 40 which limit the extent to which the protuberance 16 may be driven axially in response to the application of hammer blows. While the fastener 10 incorporates shoulders 34—36 to limit the extent to which the clamping members may be urged toward the work, abutments 40 of the fastener 10-a limit the extent of the deformation or spreading of the shank 28. In Fig. 4 the various parts of the fastener corresponding with parts identical to the fastener 10 are similarly numbered, but bear the suffix "a." The blank from which the fastener 10-a may be produced is illustrated in Fig. 8.

In Fig. 5 a slightly modified fastener is shown which is designated generally by the numeral 10-b. This fastener incorporates a single work clamping member 24-b. This work clamping member 24-b is open-sided to permit the insertion or withdrawal of a work part after the fastener has been secured in place. In all other respects the fastener 10-b is similar to the fastener 10 except that the protruding portion or projection 16-b and the associated shank portions 12-b—14-b, and 18-b—20-b are formed from a blank having the taper illustrated in Fig. 9. By having this tapered configuration the protuberance 16-b can only be driven into the work to the point where the side edges thereof wedge themselves into the work aperture 30. Of course the structure of Fig. 5 may be made from a blank similar to the blanks shown in Fig. 7 and Fig. 8.

In Fig. 6 a further modification of the fastener is shown designated generally by the numeral 10-c. This fastener is similar to the fastener 10-a illustrated in Fig. 4, with the exception that the work engaging members 22-c—24-c are substantially circular in cross-section. This arrangement provides a resilient head structure which when used in association with a pair of work pieces or sheets 42—44, cooperates with the expanded shank 28-c in clamping said work sheets together. The circular members 22-c—24-c, in addition to providing resilient head portions, may also be employed as holding means for work parts.

In instances where it is desirable to retain the fastener within the work aperture before hammer blows are applied to the protuberance, the arms of shank 28-b as illustrated in Fig. 5 may be flared outwardly to a slight degree. This requires the shank arms to be compressed toward each other in order to pass them through the work aperture, and as they spring outwardly again they provide sufficient frictional contact with the work material defining the aperture 30 to prevent the fastener from becoming inadvertently dislodged from the aperture. That is to say, by outwardly flaring the shank arms a temporary retention means is provided. It might be said that the shank portion of each of the fasteners illustrated in the accompanying drawings comprises strips of elongated resilient sheet stock, portions of which are bent back upon themselves to provide outer arms and inner adjacent arms, the bends providing the entering extremity of the fastener shank. An extension of these inner arms provides the protuberance and the outer or free extremities of the outer arms have a continuation in the form of a head extending laterally from the shank axis.

From the foregoing it will be apparent that the present invention contemplates a simple improved fastener device designed to be secured in place by the application of hammer blows to a protruding shank portion of the fastener. It is contemplated that power driven riveting hammers may be used to apply driving force to the protruding portion. It will also be apparent from the foregoing description that the fastener lends itself for use in instances where parts are to be clamped in position against a work surface without subjecting such parts to excessive pressure. Thus relatively light gauge tubular material or relatively soft material may be firmly yet resiliently held in place without crushing or deleterious impingement. In fact, the invention contemplates a fastener which will serve to retain very fragile work parts in place, such for example as glass, plastic, and other similar breakable materials. The complete loop form of resilient heads illustrated in Fig. 6 are readily adapted for accommodating work parts of various sizes and shapes. In most instances it is preferable to have the extremity of the heads or work clamping members terminate at a point which is spaced outwardly from the work surface when the fastener is finally secured in position, as illustrated in Fig. 2. Stating it in another way, the free extremities of the heads terminate at a point outwardly spaced from a plane which is coincident with the abutments 34—36 and perpendicular to the shank axis.

As further illustrative of the different forms which the fastener may take, for adaptation to different types of work pieces, attention is directed to the embodiment illustrated in Figs. 10 and 11. In this instance the fastener designated 10-d is generally similar to the fastener 10 of Fig. 1, with the exception that the work holding or clamping members as indicated at 22-d—24-d are laterally extending, and are adapted at their ends to cooperate with and retain in position a molding strip or the like 50 which may be either snapped vertically or slipped horizontally into position after the fastener has been applied to the work support 26. It will thus be seen that by variously shaping the holding or clamping members of the fastener, such as the members 22-d—24-d, the fastener may be adapted to the holding of various types of work parts, which work parts may be applied to the fastener as an incident to the application of the fastener to the main work support surface, such as the surface 26, or subsequent to the securing of the fastener to the work support surface, as may be desired.

In Figs. 12-16 a still further embodiment is illustrated, the fastener in this instance being designated by the reference numeral 10-e. The fastener has its shank portions formed in a manner generally similar to the fastener hereinbefore described in reference to Fig. 5, in that the central shank portions 12-e—14-e are provided with tapered surfaces as indicated at 52 acting as limiting stops for the hammer driven protuberance in a manner similar to the shoulders 40 previously described. Also in this instance the ribs 38-e of the clamping members or heads 22-e—24-e are laterally spaced, and are arranged to receive therebetween the centrally disposed ribs 54 of the central shank portion of the fastener, when the parts are in operative position. More particularly, referring to Fig. 13, as the protuberance 16-e is driven downwardly, to effect the spreading of the fastener shank 28-e, the ribs 54 are received between the ribs 38-e, and said ribs 54 exert a camming action to spread the fastener shank portions 18-e—20-e and firmly lock the fastener within the opening 30 of the work piece or support member 26. The ribs 54 thus comprise cam means and serve the dual purpose of rigidifying the protuberance 16-e, to receive the hammer blows, and also of spreading the fastener shank portions so as to aid in interlocking the fastener with the support surface on which it is to be mounted. The ribs 38-e act as guide surfaces for the ribs 54, thus aiding in maintaining the protuberance 16-e in proper upright position during the hammering action. The ribs 38-e thus also perform a dual function of strengthening the clamping members 22-e—24-e, and also guiding and supporting the hammer protuberance 16-e in the operation of the unit.

While, for purposes of illustration, said structural embodiments have been shown in the drawings, it will be apparent that other modifications and changes are contemplated without departing from the spirit and scope of the appended claims.

The invention is hereby claimed as follows:

1. A blind fastener comprising an elongated strip of sheet material having different widths along its length and bent into substantially W-shape to provide outer arms and adjacently positioned inner arms extending in general parallelism, the bends connecting the outer arms to the inner arms forming the entering end of the fastener, said outer arms and adjacent portions of the inner arms having a length greater than the thickness of the apertured work through which said arms are to be inserted, axial continuations of said outer arms being abruptly widened along their longitudinal margins to provide work engaging shoulders and including a portion extending axially beyond at least one of said shoulders and diverging outwardly and downwardly in substantially arcuate form to provide a hook-like object embracing surface having the intermediate clamping surface thereof disposed substantially centrally between the axially and downwardly extending portions and spaced axially outwardly from a plane coincident with said shoulders and with the said plane defining the limit of the extent of the downwardly extending portion, said inner arms extending axially beyond said shoulders in position to be engaged by a suitable pressure applying tool after the entering end of the fastener has been inserted into a work aperture, said shoulders serving to limit the extent of axial movement of said outer arms in the direction of the applied force so as accurately to position the object clamping surface with respect to the surface of a complemental work piece, said outer arms being adapted, as an incident to the axial shifting thereof, to spread laterally and thereby coact with said shoulders in gripping a work piece therebetween.

2. A blind fastener as set forth in claim 1, wherein each of the inner arms is provided with an axially extending rib terminating short of the entering extremity of said inner arms.

3. A blind fastener as set forth in claim 1, wherein the portions of the inner and outer arms are insertable through a work aperture normally diverging from each other in the vicinity of their entering extremities to facilitate initial assembly of said fastener with an apertured work piece.

4. A blind fastener comprising an elongated strip of sheet material having different widths along its length and bent into substantially W-shape to provide outer arms and adjacently positioned inner arms extending in general parallelism, the bends connecting the outer arms to the inner arms forming the entering end of the fastener, said outer arms and adjacent portions of the inner arms having a length greater than the thickness of the apertured work through which said arms are to be inserted, axial continuations of said outer arms being abruptly widened along their longitudinal margins to provide work engaging shoulders, a head section extending axially and diverging radially outwardly from at least one of said shoulders to present an object clamping surface having a portion thereof spaced axially from a plane coincident with said shoulders, said inner arms extending axially beyond said shoulders in position to be engaged by a suitable pressure applying tool after the entering end of the fastener has been inserted into a work aperture, said shoulders serving to limit the extent of axial movement of said outer arms in the direction of the applied force so as accurately to position the object clamping surface with respect to the surface of a complemental work piece, said outer arms being adapted, as an incident to the axial shifting thereof, to spread laterally and thereby coact with said shoulders in gripping a work piece therebetween, and work engaging abutments on said inner arms to limit the extent to which the said inner arms may be axially shifted with respect to the work piece.

5. A blind fastener as set forth in claim 4, wherein the head section consists of axially and radially diverging continuations of the outer arms so as to provide a pair of object clamping surfaces.

OUGLJESA JULES POUPITCH.

REFERENCES CITED

The following references are of record in the file of this patent:

UNITED STATES PATENTS

| Number | Name | Date |
| --- | --- | --- |
| 946,742 | Tweet | Jan. 18, 1910 |
| 964,226 | Farrand | July 12, 1910 |
| 1,031,431 | Dunn | July 2, 1912 |
| 1,203,669 | Whiteside | Nov. 7, 1916 |
| 2,061,463 | Hall | Nov. 17, 1936 |
| 2,128,004 | Lombard | Aug. 23, 1938 |
| 2,156,670 | Van Uum | May 2, 1939 |
| 2,176,405 | Lombard | Oct. 17, 1939 |
| 2,257,855 | Place | Oct. 7, 1941 |
| 2,498,627 | Hallock | Feb. 21, 1950 |